United States Patent
Barnes et al.

[15] 3,663,187
[45] May 16, 1972

[54] ORCHARD HEATERS

[72] Inventors: Edward Barnes, Speldhurst; Kenneth H. Nance, Bromley, both of England

[73] Assignee: BP Chemicals Limited, London, England

[22] Filed: July 8, 1970

[21] Appl. No.: 53,103

[30] Foreign Application Priority Data

July 8, 1969 Great Britain......................34,637/69
Sept. 28, 1969 Great Britain......................52,713/69

[52] U.S. Cl..................................................44/40, 126/59.5
[51] Int. Cl............................................................A01g 13/06
[58] Field of Search..............................126/59.5; 44/38, 40

[56] References Cited

UNITED STATES PATENTS

| | | | |
|---|---|---|---|
| 3,338,691 | 8/1967 | Knowles | 126/59.5 UX |
| 3,362,800 | 1/1968 | Belak et al. | 126/59.5 X |
| 1,047,138 | 12/1912 | McAdie | 126/59.5 |
| 3,105,484 | 10/1963 | Goff | 126/59.5 |
| 3,428,410 | 2/1969 | Johnston et al. | 126/59.5 X |

Primary Examiner—Charles J. Myhre
Attorney—Brooks, Haidt & Haffner

[57] ABSTRACT

An orchard heater has sides of flame retardant material and base and cover of combustible material. The heater is filled with solid combustible composition eg. wax and the base and cover are so shaped that the heaters may be stacked vertically.

10 Claims, 7 Drawing Figures

PATENTED MAY 16 1972 3,663,187
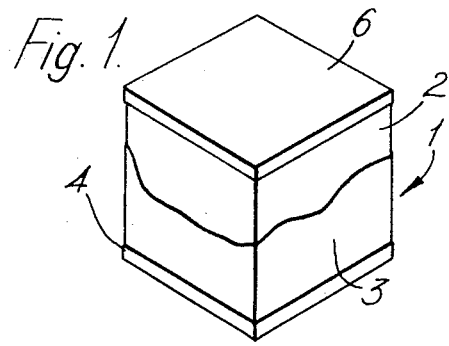
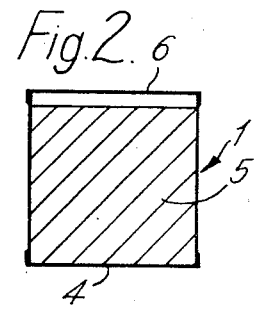
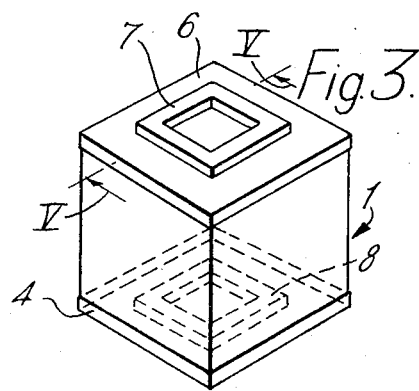
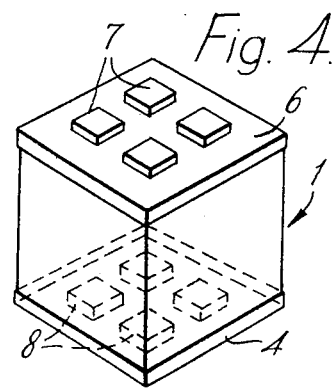
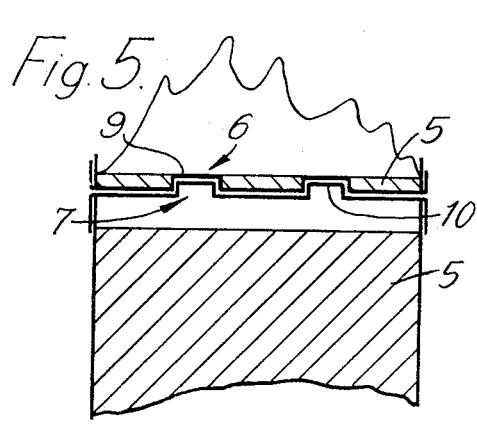
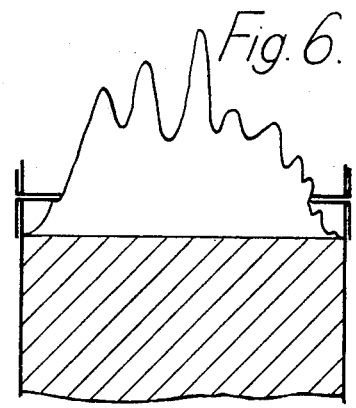
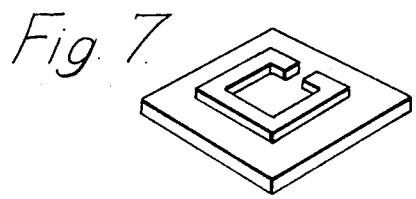

ORCHARD HEATERS

This invention relates to orchard heaters.

Growing crops and plants are subject to damage if exposed to periods of cold weather. Thus orchards in particular may suffer considerable losses in fruit production if subjected to frost at certain stages in the growth of the trees. It has been proposed to protect crops and plants against frost damage by a variety of methods, none of which are entirely satisfactory. U.K. Pat. Specification No. 1,126,014 discusses these various methods and discloses a heater for use in the protection of growing crops and plants which comprises a fire-resistant container having an open end and containing a heating composition consisting of a wax component and a buoyant particulate material. The heater preferably has a metal base.

The heater described above has a number of disadvantages. As it is open at the top, the filling is not protected from the weather, and the possibility that some wax may get on to the outside surface of the container, thus making handling more unpleasant and difficult, is increased. Furthermore suppose it is found necessary to burn a heater for only a portion of its life during one period of cold weather, say for 4 hours out of an 8 hour life, and the next period of cold weather requires heating for 6 hours the person supervising the heaters must visit each three times in the course of the 6 hours; the first time to ignite the partially spent heater, the second time to ignite a second heater when the first has burnt out, and the third time to extinguish the second heater. As the periods of cold or frosty weather generally occur at night, it will be readily understood that it would be highly desirable to be able to eliminate the necessity to go to each heater and light a new one when the first heater burns out. However although the subject of protecting plants against frost has been studied for many years, no one has solved the problem of making orchard heaters which can be burned individually and yet can be combined to burn one after the other in succession without further attention.

According to the present invention an orchard heater comprises a container containing a solid combustible composition, the side wall of the container being formed of a flame-retardent material the rate of combustion of which is lower than that of the solid combustible material, the container having a base and cover of combustible material, the base and cover being so shaped that one container may be stacked vertically upon another.

By providing a cover and base the contents of the container are protected against the weather, so that the heaters may if desired be stored in the open thus economizing on storage costs. By making the cover and base of combustible material and so shaped that the one container may be stacked vertically upon another, the heaters can be combined to give total burning times in excess of the life of an individual heater. This is achieved by stacking the heaters one above the other, the combustible base of one burning through to the combustible cover of the one below, (which then burns through to ignite the combustible composition underneath) when the upper heater burns out. It will be noted that the use of a cover and base more combustible than the flame-resistant side wall is in marked contrast to the prior art where if a base of material different from that of the walls is provided it is generally of metal or like non-combustible material.

It has been found desirable to provide the base and cover with raised portions disposed so as to be in register when one container is placed upon the other. References to 'raised' are to be considered in relation to the operative position of the heater so that the raised portion of the cover will extend outwardly from the interior of the heater, while the raised portion of the base will extend upwardly, and thus extend inwardly towards the interior of the heater. By providing such raised portions it is found that when a stack of heaters is used a lower heater will be ignited more readily when the heater above burns out then if the base and cover were flat.

The raised portion of the cover and base may be in the form of a raised repeating pattern. It will be appreciated that the pattern may be of a variety of designs. However, it is preferred that the design is so pronounced that as the uppermost heater burns, part of the base becomes exposed, together with the corresponding part of the cover of the lower heater, and burns so dropping an appreciable quantity of burning combustible material into the lower heater unit.

Suitable materials of construction for the side wall include card or other combustible materials with an outer layer of non-combustible or slightly combustible material such as aluminum foil.

Suitable materials for the base and cover include polyethylene polypropylene and polystyrene, a preferred material being unfilled polystyrene.

Suitable solid combustible compositions include combustible waxes or fats which at normal temperatures are in a solid or semi-solid state, for example slack wax, paraffin wax and animal fats, and also oils solidified by the addition of gelling agents or absorbed in a low density absorbent material e.g. foamed styrene granules. By solid compositions is meant a composition of such high viscosity that there is no risk of spillage in transport under normal conditions.

It is not necessary for heaters according to the present invention to be filled with a wick other than that which coincidentally occurs with the construction of the container.

In use such a heater can be placed in a suitable position in an orchard without any further preparation and left through varying weather conditions until required. When required it is only necessary to apply a fierce igniting source such as a gas torch to the top of the unit, when the top cover will burn away quickly and the wax or similar material become ignited and provide frost protection for a considerable number of hours. As explained above one of the defects with existing heaters using similar materials is that partially used candles must be lit for shorter times. The heater of the invention, having a combustible cover and base, is so designed that a partially consumed and extinguished unit can be placed on to a new unit after ignition. The partially consumed unit will burn down to its combustible base, through the top of the new unit, so igniting the new unit, which will then continue to burn in the normal manner. It will be seen that this feature enables the most economic use to be made of heaters of this type and furthermore if very long frosts are expected or heating periods of a greater length than the life of one heater are desired, two or more heaters can be stacked together and ignited so as to give the desired length of heat production.

A further advantage of this construction of heater is that no dangerous residues are left in the orchard or other area being heated which could damage mowers and similar tools which may be required in the cultivation procedure, as is the case if heaters with metal bases are used.

The invention will now be further illustrated by reference to the examples and the accompanying drawings in which FIG. 1 is a general view of an orchard heater according to the invention, with the outer layer of aluminum foil partly removed.

FIG. 2 is a cross section view of the orchard heater shown in FIG. 1, with the aluminum foil in place.

FIG. 3 is a general view of an orchard heater according to the invention having a cover and base with raised portions.

FIG. 4 is a general view of another form of orchard heater having a cover and base with raised portions.

FIG. 5 is a cross-sectional view of the adjacent parts of two orchard heaters as shown in FIG. 3 stacked one above the other in use.

FIG. 6 is another cross-sectional part view of the two orchard heaters shown in FIG. 5 in use.

FIG. 7 is a general view of a modified form of the lid fitted to the heater shown in FIG. 3.

The embodiment of the invention shown in FIGS. 1 and 2 was prepared by taking a 7 × 7 inch sleeve 1 of 0.028-inch white line chip card 2 covered with a layer of 0.009-inch thick laminated aluminum foil 3 and closing one end of the sleeve by a base plate 4 formed from a sheet of 0.015-inch thick unfilled polystyrene.

The box was filled with molten slack wax 5, allowed to cool and completely topped up with more molten wax to compensate for the shrinkage of the original quantity of wax on cooling. The heater was then closed with a lid 6 of the same material as the base. FIG. 3 shows an orchard heater made from the same materials as that shown in FIGS. 1 and 2 except that the polystyrene cover 6 and base 4 are each provided respectively with a continuous raised portion 7 and 8. The other numerals have the same meaning as in FIGS. 1 and 2. When two heaters are stacked one above the other the raised portion 7 is in register with raised portion 8.

FIG. 4 shows an orchard heater made from the same materials as that shown in FIGS. 1 and 2 except that the polystyrene base and cover is provided with discrete raised portions or studs 8 and 7. The other numerals have the same meaning as in FIGS. 1 and 2. The studs 7 are disposed so as to register with the studs 8 when two heaters are stacked one above the other.

FIG. 5 shows the lower part of one heater as shown in FIG. 3 resting on the upper part of another heater according to FIG. 3. The wax 5 has burned down to expose the upper parts 9 of the raised portion 8 of the polystyrene cover. These portions rapidly burn through and ignited wax falls through on to the wax in the heater below and ignites it. The remainder of the base 4 and cover 6 burn away rapidly and the result is shown in FIG. 6 in which the lower heater is fully ignited.

The gap shown in FIG. 7 in the raised portion prevents rain water accumulating on the central portion of the lid when the heater is left in the open.

It will be appreciated that a heater which is suitable for heating orchards may also be useful for other heating purposes.

We claim:

1. An orchard heater comprising a container having a side wall, a base, and a cover, said container being filled with a solid combustible material, the side wall being formed of a flame-retardant material the rate of combustion of which is lower than that of the solid combustible material, both the base and cover being formed of combustible material which is more readily combustible than the material of said side wall and so shaped that one container may be stacked vertically upon another.

2. The orchard heater according to claim 1 wherein the base and cover are provided with complementary raised and recessed portions disposed so as to be in register when one container is placed upon the other.

3. An orchard heater according to claim 2 wherein the raised portion is in the form of a repeating pattern.

4. An orchard heater according to claim 1 wherein the solid combustible composition is a combustible wax or fat which is solid or semi-solid at normal temperatures.

5. An orchard heater according to claim 4 wherein the solid combustible composition is slack wax.

6. An orchard heater according to claim 2 wherein the solid combustible composition is oil solidified by a gelling agent.

7. An orchard heater according to claim 2 wherein the solid combustible composition is oil absorbed in a low density absorbent material.

8. An orchard heater according to claim 1 wherein the flame retardant material is card covered with aluminum foil.

9. An orchard heater according to claim 1 wherein the base and cover are combustible thermoplastic.

10. An orchard heater according to claim 9 wherein the base and cover are of unfilled polystyrene.

* * * * *